Patented Dec. 15, 1925.

1,565,911

UNITED STATES PATENT OFFICE.

CHARLES B. DAVIS, OF NEW YORK, N. Y.

ACTIVATING DECOLORIZING CHAR FOR USE IN REFINING SUGAR AND ANALOGOUS PURPOSES.

No Drawing.   Application filed October 10, 1923. Serial No. 667,629.

*To all whom it may concern:*

Be it known that I, CHARLES B. DAVIS, a citizen of the United States, and a resident of the borough of Manhattan, city, county, and State of New York, have invented certain new and useful Improvements in Activating Decolorizing Char for Use in Refining Sugar and for Analogous Purposes, of which the following is a specification sufficient to enable those skilled in the art to which the invention appertains to utilize the same.

The object of my invention is to effect the activating and hardening of decolorizing char in a simple, effective, and comparatively inexpensive manner; and it consists primarily and essentially in the use, for the purpose, of a distillate obtained from bituminous matter, substantially as hereinafter set forth, and claimed specifically.

As is well known in the prior state of the art, new animal bone char used in the refining of raw cane sugar, possesses very little decolorizing power, but by constant use it adsorbs and absorbs certain impurities from the sugar liquors which improve it in this respect.

I have found by research investigation that the impurities which cause this increase in decolorizing power are pyrogenous substances from wax, albumen and oily matters present in the raw sugar product. These waxy, albuminous and oily matters, in the presence of water, heat and pressure split up into synthetic bituminous (hydrocarbon) matters which, on carbonization and in presence of a carbonized bone structure such as the animal product, deposit a special carbon possessing intense decolorizing and hardening power, as well as a capacity for removing gums, albuminous matters, and mineral constituents, or ash. This process however of building up this special carbon derived from the raw sugar impurities is so slow and costly that by the time it is noticeable at all the char has glazed over, becoming clogged so that it must be discarded from use as a char for further sugar refining.

I have also found that the synthetic pyrobituminous matters above referred to are contained in the distillate from coal, coming over between 315° C. and 450° C. Also that distillates other than this will clog the finished char with soot and coke, and render it unfit for use. Therefore such distillates as benzol, pyridine, etc., and also those above 450° C. and near the coking stage are detrimental for this purpose.

This product from coal distilled over between 315° C. and 450° C. is of waxy consistency, and yellow to brown in color. It leaves no coke on volatilization out of contact with air.

In carrying out my process of activating chars used in decolorizing the char is mixed with approximately 5% of its weight of the coal distillate and passed through a kiln out of contact with air at bright red heat of about 600° C. to 900° C., then cooled out of contact with air, washed with hot water, dried and rekilned, when it is ready for use.

I have found that after the char thus treated has become exhausted as a decolorizer by its use in refining raw sugar, that less than $\frac{1}{10}$ of 1% of the activator has been rendered inactive, and that if this amount is again added before the char is rekilned out of contact with air to eliminate absorbed impurities, that it is reactivated or regenerated to a degree more than equal to the new product, its quality increasing with age and use; and also that this process of reactivation can be continued indefinitely, the char being hardened in structure at the same time.

In adding this waxy coal distillate to the char before kilning it may be sprayed on or mixed with powdered char and the resulting compound mingled with the main body or mass of char, and then this passed through the kiln out of contact with air. Or the waxy coal distillate may be converted into a watery emulsion with lime water, molasses residues, or other colloidal substances, and this watery emulsion introduced into the char before kilning.

It is to be understood that I do not restrict myself to animal bone char, since synthetic bone char, discard char, char made from refinery "press-cake mud" containing calcium phosphate and decolorizing char in general, may be so treated with substantially like results.

The finished char thus attained is free from carbonates uncombined with my special carbon.

I have found that my method is especially efficacious in the treatment of synthetic bone char.

I have also found that it is only required to add more or less of the active principle obtained by the distillation herein set forth to obtain the desired results.

What I claim as my invention and wish to secure by Letters Patent is:

1. The process of activating bone char herein set forth, consisting essentially in adding thereto a carbon-forming distillate of coal, which is non-volatile at ordinary temperatures, passing the same through a kiln out of contact with air at a red heat, under 1000° C., cooling the resultant out of contact with air, washing the same with hot water, and then drying and kilning out of contact with air prior to use, substantially in the manner and for the purpose set forth.

2. The process of activating bone char herein set forth, consisting essentially in adding thereto a distillate of coal obtained at a temperature of between 315° C. and 450° C., passing the same through a kiln out of contact with air at a temperature approximating 600° C. to 900° C., cooling the resultant out of contact with air, washing the same with hot water and then drying and rekilning out of contact with air prior to use, substantially in the manner and for the purpose set forth.

3. The process of activating and hardening decolorizing char herein set forth, consisting essentially in adding thereto a bituminous distillate non-volatile at ordinary temperatures, subjecting the same to red heat out of contact with air, and then cooling, substantially as set forth.

4. As an article of manufacture a decolorizing char treated with a bituminous distillate non-volatile at ordinary temperatures, subjecting the same to red heat out of contact with air, and then cooling, substantially as set forth.

5. As an article of manufacture, a decolorizing char treated with a distillate obtained from bituminous matter at a temperature between 315° C. and 450° C.

6. The process of activating and hardening synthetic bone char herein set forth, consisting essentially in adding thereto a bituminous distillate non-volatile at ordinary temperatures, subjecting the same to red heat out of contact with air, and then cooling, substantially as set forth.

7. The process of activating and hardening decolorizing carbon herein set forth, consisting in adding thereto a bituminous distillate of coal obtained at a temperature of between 315° C. and 450° C. non-volatile at ordinary temperatures, subjecting the same to red heat out of contact with air, and then cooling, substantially as set forth.

CHARLES B. DAVIS.